United States Patent [19]

Heising et al.

[11] 3,878,479
[45] Apr. 15, 1975

[54] MEANS FOR REGULATING VAPOR PRESSURE IN A METAL-VAPOR LASER

[75] Inventors: Steven James Heising, San Jose; Mark W. Dowley, Palo Alto, both of Calif.

[73] Assignee: Coherent Radiation, Palo Alto, Calif.

[22] Filed: Apr. 27, 1973

[21] Appl. No.: 355,155

[52] U.S. Cl.... 331/94.5 T; 331/94.5 D; 331/94.5 G; 330/4.3; 313/225; 313/174
[51] Int. Cl. ............................................ H01s 3/22
[58] Field of Search ............ 331/94.5, 4.3; 313/225, 313/227, 228, 174

[56] References Cited
UNITED STATES PATENTS
3,748,595   7/1973   Rigden ............................... 331/94.5

Primary Examiner—Ronald L. Wibert
Assistant Examiner—R. J. Webster
Attorney, Agent, or Firm—Limbach, Limbach & Sutton

[57] ABSTRACT

A metal-vapor laser is disclosed having improved means for automatically controlling the vapor pressure of the metallic laser constituent, utilizing the geometry of the discharge tube envelope.

3 Claims, 3 Drawing Figures

PATENTED APR 15 1975  3,878,479
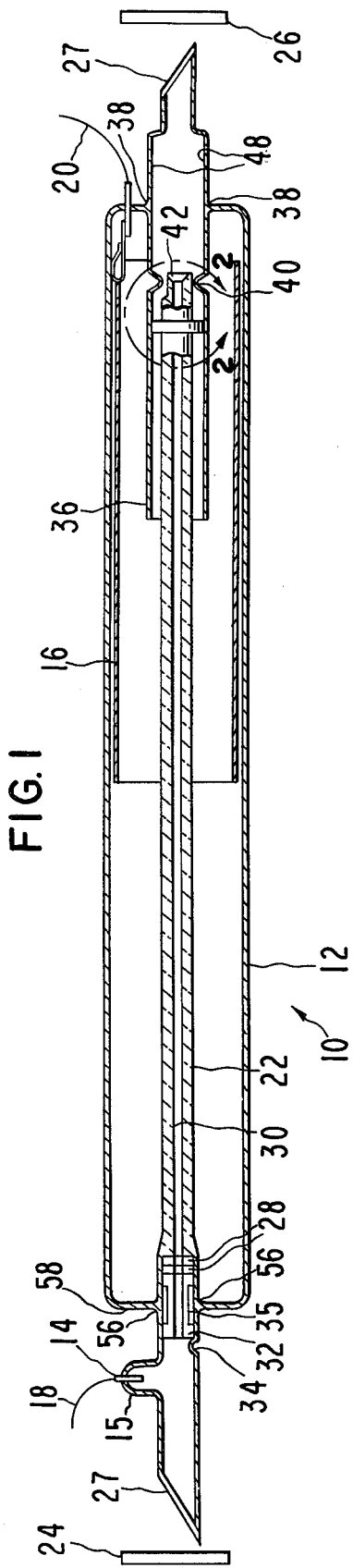
FIG. 1
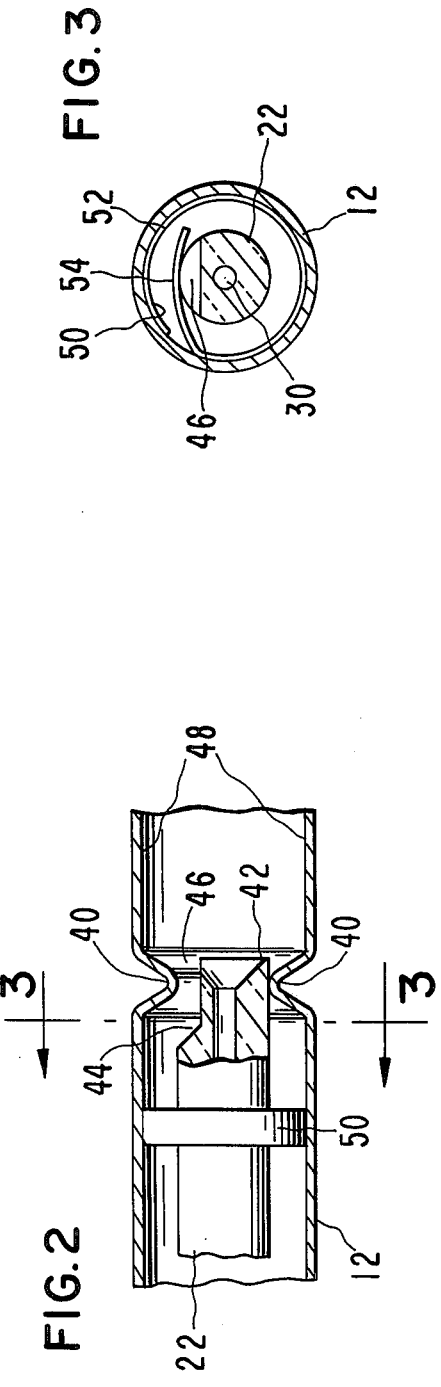
FIG. 2
FIG. 3

MEANS FOR REGULATING VAPOR PRESSURE IN A METAL-VAPOR LASER

BACKGROUND OF THE INVENTION

The present invention relates to gas lasers and, in particular, to gas lasers wherein one or more of the constituents within the laser is non-gaseous at ordinary atmospheric temperatures but which is in the vapor state while functioning as the active laser medium and which thereafter condenses out of the vapor state.

A class of gaseous lasers which have received much interest recently are frequently referred to as metal-vapor lasers. Such lasers include the helium-cadmium, helium-selenium, helium-cesium and helium-mercury lasers. One common feature of each of these lasers is that the active lasing ingredient, i.e. the metal, is not in the vapor state at normal ambient atmospheric temperatures. Thus, in each case, the active ingredient must be vaporized to a sufficient pressure for the laser to operate. The helium serves as a means of transferring energy to the vaporized metal atoms in a manner well-known to those skilled in the laser art.

The helium-cadmium and helium-selenium lasers are of particular interest. Both are relatively simple to construct and operate, and there appears to be numerous applications for each. The helium-cadmium laser provides two strong continuous wave outputs, one at 4416 A (blue) and another at 3250 A (ultraviolet). The helium-selenium laser is attractive since it produces many strong lines in different parts of the spectrum, including blue, green, yellow, orange, red and infrared. For more information about the history, background and theory of operation of metal-vapor lasers, reference is made to an article entitled "Metal-Vapor Lasers" by William T. Silfvast, *Scientific American*, February 1973, pp. 89–97.

In the operation, for example, of a typical helium-cadmium laser, the cadmium which, at normal room temperatures is a solid, is heated sufficiently to cause a high enough pressure of the cadmium vapor for lasing action to occur. Since the pressure within the laser envelope is considerably less than atmospheric pressures, this occurs more readily than would be the case at atmospheric pressures. The vaporized cadmium is mixed with the helium, normally within a discharge confining bore tube, by cataphoretic movement of the ionized cadmium atoms from the anode towards the cathode.

One way of providing cadmium at the proper vapor pressures within the tube is to heat the cadmium by a heat source external to the discharge tube. Many early helium-cadmium lasers have been constructed in this manner.

Another approach is to utilize the heat of the discharge within the laser discharge tube itself to vaporize the cadmium. See, for example, U.S. Pat. No. 3,614,658 and the *Scientific American* article referred to above, at page 96. One advantage of this approach is that since the discharge power is inversely related to the cadmium vapor pressure, the laser tends to be self-regulating.

However, the latter arrangement requires that an operating temperature be established to provide the correct vapor pressure. To do this the temperature of the cadmium must be kept within a small range of temperatures, depending upon a number of variables including the desired cadmium partial pressure, the heat of the discharge, and the total gas pressure within the discharge tube, including the helium.

Prior art lasers utilize heat sinks or other cooling means in order to establish the proper operating temperature of the cadmium. This has the effect of making the laser construction more bulky and more expensive.

SUMMARY OF THE INVENTION

It is, therefore, an object of the present invention to provide improved means for automatically regulating the vapor pressure in a metal-vapor laser.

Another object of the invention is to provide improved means for establishing the operating temperature of a metal vapor laser where the metal is vaporized by action of the laser discharge current.

In accordance with the invention, the geometry of the discharge tube envelope itself is utilized to establish the proper temperature of the metal in a metal-vapor laser, where the metal is vaporized by means of the electrical discharge within the laser discharge tube.

In the preferred embodiment of the invention, the metal is situated near the anode end of the discharge tube and in proximity with the active discharge region. The heat of the discharge causes the metal constituent to vaporize in the low pressure atmosphere of the discharge tube.

Preferably, the non-gaseous constituent passes within a discharge-confining bore tube. The gas discharge envelope is sealed to the discharge-confining bore tube by means of a discshaped cap. By positioning the disc-shaped cap relative to the position of the metal, the heat dissipation from the metal, and hence the temperature of the metal is established. Once established, the metal-vapor laser is self-regulatory in the manner described above.

Of course, the geometry of the discharge tube envelope may be utilized in a number of ways to control the temperature of the non-gaseous constituent and, hence, its vapor pressure during the operation of the laser. For example, the thickness of the discharge tube envelope will also effect the rate at which heat is dissipated from the non-gaseous constituent. Thus, the present invention should not be limited only to the particular embodiment described herein.

While the embodiment of the present invention described herein specifically relates to metal-vapor lasers, it should be understood that the present invention is not intended to be so limited. The present invention is applicable to other lasers having a non-gaseous constituent which is in the vapor state during the operation of the laser.

BRIEF DESCRIPTION OF THE DRAWINGS

FIG. 1 is a cross-sectional view of a laser incorporating the present invention.

FIG. 2 is an enlargement of a part of the laser of FIG. 1.

FIG. 3 is a cross-sectional view of the enlargement of FIG. 2 in a direction indicated by the arrows.

DESCRIPTION OF THE PREFERRED EMBODIMENT

A laser 10 incorporating the present invention is shown in FIG. 1. Located at one end of a gas-containing envelope or discharge tube 12 is an anode 14 situated in an anode appendage 15. Envelope 12 is made of a suitable material such as pyrex glass. A cylindrically-shaped cathode 16 is enclosed at the other end of the envelope 12. Lead wires 18 and 20 are connected respectively to the anode 14 and the cathode 16.

The cylindrical cathode 16 is axially aligned with and surrounds the end of a discharge-confining bore tube 22. The purpose of the bore tube 22 is to concentrate the electrical discharge between the anode 14 and the cathode 16 within a relatively small volume and thereby increase the current density through the gaseous lasing medium within the discharge tube 12.

Axially aligned with the bore tube 22 is an optical resonator comprising a totally reflecting mirror 24 and an output mirror 26 which transmits a small percentage of the light impinging upon it.

The ends of the discharge tube envelope 12 are sealed by means of a pair of Brewster windows 27 in a manner well-known to those skilled in the art. However, it should be understood that the present invention is equally applicable to a laser where the optical resonator forms an integral part of the discharge tube 12. In this case, then, the Brewster windows 27 are replaced with the optical resonator mirrors 24 and 26.

Situated near the anode end of the discharge tube 12 are a pair of washers 28 each having a central aperture axially aligned with the discharge path 30. Washers 28 are held in place by a generally cylindrically-shaped insulating insert 32 having a central bore aligned with the bore tube 22. Insert 32 is maintained in place against washers 28 by a crimp 34 in the wall of the gas envelope near the cathode. Insert 32 also has a circumferentially-extending recess 35 which aids in preventing unwanted vapor condensation on or in the vicinity of Brewster window 27.

The material from which washers 28 are made is the metal or other normally non-gaseous constituent which must be vaporized for the operation of laser 10. In the helium-cadmium laser embodiment shown, the washers 28 are made of the metal cadmium. The washers 28 are exposed to the electrical discharge between the anode 14 and the cathode 16. The heat of this discharge causes the cadmium washers 28 to slowly vaporize.

Also confined within the envelope 12 is the gaseous element helium. The discharge between the anode 14 and the cathode 16 excites the helium to an elevated energy state from which energy is imparted to the vaporized cadmium atoms. This causes the cadmium to ionize and to be excited to the required energy levels required for lasing action. The ionized cadmium atoms are then transported along the length of the discharge confining bore tube 22 toward the cathode end of the tube due to cataphoresis in a manner well-known to those skilled in the art. The cataphoretic transportation of the cadmium also provides additional mixing with the excited helium atoms.

Surrounding the cathode end of the bore tube 22 is a generally cylindrical umbrella member 36 made of an electrically insulating material such as pyrex. Cylindrical member 36 forms a part of and is supported by the envelope 12 at 38. The purpose of the cylindrical member 36 is to distribute the current of the electrical discharge so that all of the current does not strike or impinge upon the cathode at a single spot or area.

Current distributing member 36 has a circumferentially-extending dimpled-ridge or waist 40. Member 36 with the dimpled-ridge 40 serves two functions. First, it serves as a support and retainer for the open end 42 of the discharge-confining bore tube 22. The aperture defined by the dimpled-ridge 40 maintains the bore tube 22 in proper radial alignment with respect to the optical resonator mirrors while at the same time allowing for variations in thermal expansion rates of the bore tube 22 and the envelope 12.

The second purpose can best be seen by referring additionally to FIGS. 2 and 3. The open end 42 of the bore tube 22 has a cut-out portion 44 which in combination with the dimpled-ridge 40 forms a restricted passageway 46. To prevent burial of helium ions, it is necessary to cause condensation of the spent cadmium to occur outside of the area of the active discharge region. The electrical discharge between the anode 14 and the cathode 16 is reversed as it leaves the end of 42 by the surrounding umbrella member 36. Immediately after the discharge current reverses, it passes through the restricted passageway 46. As previously explained, the vaporized cadmium flows from the anode end of the bore tube 22 along the bore tube 22 and out of the open end 42 by virtue of cataphoresis. Because of the momentum of the vaporized cadmium atoms, the flow of the vaporized cadmium out of the open end 42 of the bore tube 22 can not follow the path of the reversed discharge current through the restricted passageway 46.

The spent cadmium then condenses in region 48 outside of the active discharge region. The temperature of the region 48 is cooler than the temperature in the bore tube since it is removed from the area of the discharge region. Hence, the condensation of the cadmium occurs in an area where helium ions do not exist and helium burial is thereby prevented. The region 48 is made with a larger diameter than bore tube aperture 30 so that the condensing cadmium is out of the way of the light reflected between mirrors 24 and 26 so that the laser mode will not be adversely affected.

Because of the recess 44 in the bore tube 22, a spring bias clip 50 shown in FIGS. 1–3 is used to force the bore tube 22 snugly against the dimpled ridge. The spring clip 50 has a main circular portion 52 which fits against the inside surface of the cylindrical member 16. A second portion 54 is juxtapositioned with and forces the bore tube 22 against a section of the ridges waist 40.

As explained previously, the heat of the discharge causes continuous evaporation of the cadmium from the pair of cadmium washers 28. Since the discharge power is inversely related to the cadmium vapor pressure, the system is self-regulating once a proper cadmium temperature is established, with a current regulated power supply.

In the embodiment described, the geometry of the discharge tube envelope 12 is utilized for establishing the operating temperature of the cadmium washers 28. The envelope 12 is joined and sealed to the discharge-confining bore tube 22 at 56 by means of a disc or cap member 58. It has been found that by properly positioning the cap member 58 in relation to the cadmium washers 28, the heat dissipation from the cadmium washers can be controlled and hence an operating temperature established. That is, if a lower vapor pressure of cadmium is required, the distance between the cap 58 and the washers 28 is reduced. Similarly, if greater cadmium vapor pressure is required, the distance between the junction 56 and the cadmium washers 28 is increased.

While it is believed that the above description of the invention is sufficient to enable one skilled in the arts to duplicate the same, the following table of parameters for an actual embodiment of the discharge tube 12 is provided:

TABLE A

| | |
|---|---|
| Helium pressure | 3-7 torr. |
| Cadmium vapor pressure | $10^{-2}$ torr. |
| Anode/Cathode voltage | 1500 volts |
| Discharge tube parameters: | |
| Length (between Brewster windows 27) | 455 mm. |
| O.D. (in region of bore tube) | 41 mm. |
| Envelope end cap 58/cadmium slug separation | 7-10 mm. |
| Envelope thickness | 2 mm. |
| Bore tube parameters | |
| O.D.   7.5 mm. | |
| I.D.   1.5 mm. | |

What is claimed is:

1. A laser having as part of its lasing medium a normally non-gaseous constituent which is in the vapor state during the operation of the laser, comprising:

means for providing an electrical discharge through said lasing medium said means including an anode and a cathode;

a bore tube for confining said discharge;

an optical resonator axially aligned with at least a part of said discharge path;

a generally cylindrically-shaped vapor-confining discharge tube envelope extending along said bore tube and enclosing the lasing medium and wherein said envelope is sealed to said bore tube at the anode end thereof by means of a transversely-situated cap member;

means for housing the non-gaseous constituent near the anode end of said bore tube and in proximity with at least a part of said discharge so that said non-gaseous constituent is continuously being vaporized by the heat generated therefrom; and means for utilizing the geometry of said envelope for automatically regulating the vapor pressure within said envelope of said normally non-gaseous constituent during laser operation by controlling the temperature of said normally non-gaseous constituent; and said geometric utilization means comprising means for positioning said capped end of said cylindrical envelope at a location with respect to said bore tube and said normally non-gaseous constituent whereby the desired rate of heat dissipation from said constituent is provided.

2. A laser as in claim 1 wherein said non-gaseous constituent is a metal.

3. A laser as in claim 1 wherein said non-gaseous constituent is cadmium.

\* \* \* \* \*